United States Patent Office 2,807,279
Patented Sept. 24, 1957

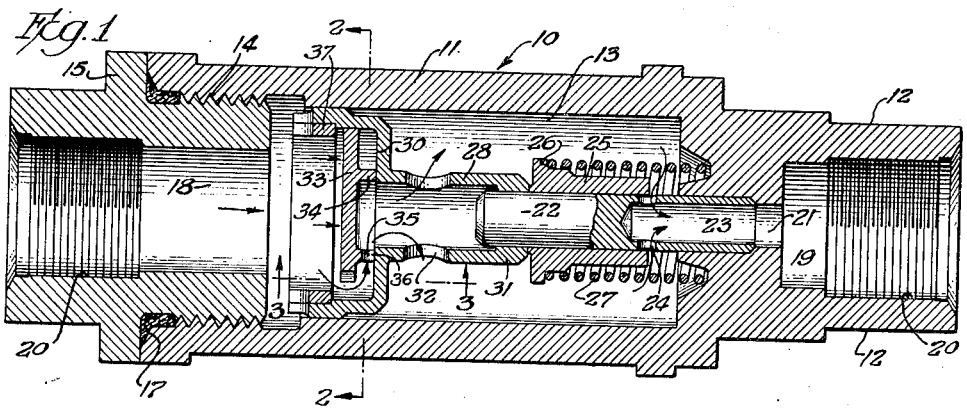

2,807,279

FLOW CONTROL VALVE

Frank G. Presnell, Hollywood, Calif.

Application August 23, 1955, Serial No. 530,167

13 Claims. (Cl. 137—493.2)

This invention relates generally to hydraulics and more specifically to apparatus for controlling or regulating the flow of hydraulic fluid through a conduit in a hydraulic system.

As is usual in flow controls employed in hydraulic systems, use is made in the present case of the principle that at a predetermined pressure differential between the inlet and outlet sides of an orifice of a given size a certain volume of fluid will flow therethrough in a predetermined time interval.

An object of this invention is to provide a valve mechanism for automatically metering the flow of hydraulic fluid through a line in one direction and permitting substantially free flow in the opposite direction. While the uses for such a valve mechanism are too numerous to mention, one example is to control the rate of movement of the fluid-actuated landing gear of an airplane toward extend position. Uncontrolled movement of such apparatus might result in the breakage or destruction of parts thereof and it is, therefore, desirable to control the movement automatically and without the attention of the pilot, the only effort required being the initial operation of a direction selector element.

Another object of the invention is to provide a flow control valve of the so-called "in-line" type which may be disposed in a fluid line and not require any further connection with controls or analogous mechanism.

Still another object of the invention is to provide a flow control valve which will avoid the objection, common to valves of prior design, of permitting unmetered leakage through the valve and the consequent faulty operation of systems in which the valves are incorporated, such unmetered leakage permitting operation of the apparatus to be controlled at different rates of speed depending upon the load, or absence thereof, different pressures at the fluid sources and many other varying conditions.

Another object of the invention is to provide a flow control valve having relatively movable members for throttling fluid flow through a passage, one of the members being movable in opposition to resilient means in response to a pressure differential caused by fluid flowing through an orifice which is formed in or by one or more elements of the valve, the latter elements being so arranged that any leakage through or around them will merely be combined with and function as a part of the measured flow of fluid through the device thus eliminating variations in the operation of apparatus governed by the valve when different conditions are encountered.

A further object of the invention is to provide a flow control valve having means for forming an orifice to create a pressure differential upon fluid flowing in one direction through the valve, reverse flow of fluid serving to move the orifice-forming parts of the valve to effect self-cleaning of the orifice, thus making the device operate under similar conditions at all times.

A still further object of the invention is to provide a flow control valve having a body with an internal chamber and inlet and outlet ports at opposite ends, there being a throttling port in the body in communication with the outlet port and a movable element for controlling the effective size of the throttling port, the chamber containing a spring which normally tends to move the movable element to increase the flow through the valve, means being provided in the chamber to form an orifice for creating a pressure differential upon fluid flowing in one direction through the valve, which pressure differential is utilized to move the movable element to reduce the effective size of the throttling port, the orifice-forming means serving, upon reverse flow through the valve, to move to increase the orifice size, or form a by-pass around the orifice, whereby the reverse flow will be substantially unimpeded.

Another object of the invention is to provide a flow control valve having a body with a chamber and inlet and outlet ports at opposite ends, the body having a projection extending into the chamber and embodying a throttling port in communication with the outlet port, a throttling sleeve being slidable on the projection to vary the effective size of the throttling port and being normally urged by a spring in a direction to increase the size of such port, the chamber containing a member guided for movement to impart motion to the throttling sleeve, the chamber also containing a member, in the nature of a poppet valve, which cooperates with the sleeve moving member to form a piston-like device which will respond to fluid pressure differences at opposite ends thereof to transmit force to the throttling sleeve to move it in a direction to reduce the effective size of the throttling port, one of the piston-forming members having an orifice to create a pressure differential upon fluid flowing through the chamber in one direction, the pressure differential being applied to the piston to move the throttling sleeve, reverse fluid flow through the chamber serving to move the poppet valve member to an open position to permit free flow of fluid in the reverse direction.

Other objects and advantages of the invention will be apparent from the following description of one embodiment thereof which has been shown in detail in the accompanying drawings.

In the drawings:

Fig. 1 is a longitudinal sectional view of a flow control valve or regulator formed in accordance with the present invention, the parts being shown in positions occupied during fluid flow through the valve from the inlet to the outlet;

Fig. 2 is a vertical transverse sectional view taken through the valve on the plane indicated by the line 2—2 of Fig. 1;

Fig. 3 is a detail fragmentary longitudinal sectional view taken on the plane indicated by the line 3—3 of Fig. 1;

Fig. 4 is a view similar to Fig. 1 but showing parts of the valve in positions occupied thereby during reverse flow of fluid through the valve;

Fig. 5 is a front elevational view of a modified orifice forming poppet-type valve which may be used in the device shown in Figs. 1 and 4; and, Fig. 6 is a vertical sectional view taken through the valve element shown in Fig. 5 on the plane indicated by the line 6—6 of Fig. 5.

Referring more particularly to the drawing, the numeral 10 designates the valve assembly which has been selected to illustrate one embodiment of the invention. It will be obvious that although but one form has been shown, the invention may be incorporated in many forms without departing from the fundamental principles involved. Valve 10 includes a body 11 of generally cylindrical shape one end portion of which is provided on opposite sides with flattened surfaces 12 to facilitate the holding of the body during assembly and incorporation of the valve in a hydraulic system. The body 11 is internally bored to provide a chamber 13 having an open end threaded as at 14 to receive a cap 15 employed to complete the body. The cap also has flattened sides 16 to accommodate a wrench used to turn the cap when assembling the same with and removing it from the body. A suitable gasket 17 is disposed between the cap and body to make the joint liquid tight.

The cap 15 and the end of the body opposite that receiving the cap are bored as at 18 and 19 and threaded as at 20 for connecting the valve in a fluid line, a reduced bore 21 extending from the bore 19 to the chamber 13. The bore 18 extends completely through the cap and constitutes the inlet of the valve. Bore 19 forms the valve outlet.

In the form of valve illustrated, the bore 21 is counterbored and a pin or rod 22 is pressed thereinto from the chamber end. Before insertion, the rod 22 is axially bored, as at 23, and provided with one or more lateral ports 24 to establish communication between the chamber and the outlet 19. When the valve is connected in a fluid line, fluid supplied to the inlet 18 flows through the chamber 13, ports 24 and bore 23 to the outlet 19.

To control this flow, the chamber 13 is provided with means for varying the effective size of the port or ports 24 to regulate the flow therethrough. This means may take different forms, however, as an example, a sleeve valve element 25 is disposed for sliding movement on the portion of the rod 22 projecting into the chamber 13. Sleeve valve element 25 is formed with an external shoulder 26 for engagement with one end of a compression spring 27 the other end of which is disposed in a seat provided therefor in the end wall of the chamber. Spring 27 normally tends to urge the sleeve in a direction to uncover or increase the effective size of the ports 24.

To move the sleeve valve element in opposition to the spring and reduce the effective size of the ports 24, a sleeve valve actuator or pusher 28 is guided for movement by the chamber walls and the rod 22. Pusher 28 could readily be formed as a part of sleeve valve element 25 but for convenience in manufacture and to eliminate problems of concentricity it is formed as a separate piece which has the general form of a piston with hollow head and stem ends 30 and 31, respectively. The stem 31 has laterally extending ports 32 to permit fluid flow from one end of the piston to the other, the stem being slidably received by the rod 22 and engaging the sleeve valve element 25. The hollow piston head receives for limited movement relative thereto, a plate-like poppet valve device 33 which is somewhat triangular in shape and is guided for sliding movement by the inner wall of the piston head. One side of the poppet valve 33 has an annular or ring-like projection 34 thereon for engaging the inner side of the piston head. This projection 34 is notched as at 35 so that when the piston surface is engaged, a restricted orifice 36 will be formed. The projection 34 engages the piston head around the bore in the stem to form a sealed joint open only at the notch or orifice 36. This engagement will take place when fluid flows through the chamber from the inlet to the outlet. The direction of this fluid flow is indicated by arrows in Fig. 1 of the drawing. When the fluid flow in this direction is initiated, it will move poppet valve 33 into engagement with the piston and form the orifice 36. Most of the fluid will pass through this orifice and in so doing will cause a pressure differential between the inlet and the outlet sides of the poppet, the higher pressure being at the inlet side. The force of the higher pressure will be transmitted through the pusher piston to the sleeve valve causing this member to move in opposition to the force of the spring 27. In so moving, the sleeve valve will reduce the effective size of port 24 to limit the volume of fluid flowing to the outlet 19.

It will be obvious to those familiar with hydraulic principles that the volume of fluid permitted to flow through the valve will depend upon the size of the orifice 36 and the resistance supplied by the spring 27. If the inlet pressure increases, piston 28 will move sleeve 25 in a direction to decrease the effective size of port 24. If the pressure at the inlet falls, or the pressure in the outlet increases, sleeve 25 will be moved by spring 27 to increase the effective size of port 24.

A feature of the invention resides in so constructing the mechanism that there will be no unmetered leakage. This feature is accomplished by constructing the valve so that any leakage flowing past the orifice-forming elements will be combined with the flow through the orifice and the pressure differential created by both will be used to actuate the flow-throttling element. All of the fluid, that flowing through the orifice and that leaking around the orifice-forming elements as well, is caused to flow through the throttling port; there will thus be no unmetered leakage flowing through the valve. Due to this construction, the fit of the piston head 30 in the chamber and the seal between the poppet and the piston need not be precise since the total flow will be considered in selecting the spring and determining the volume of fluid to be permitted to flow through the valve in any predetermined period of time.

The valve, in the form illustrated, has been designed to permit substantially unimpeded flow in the reverse direction. When flow from the inlet to the outlet ceases, spring 27 moves the sleeve valve element 25 toward the inlet end of the chamber completely exposing the ports 24. As reverse flow is initiated, the fluid will pass from the outlet 19 through the bore 21, the axial bore 23, port 24 to chamber 13. From this chamber it will flow through ports 32 into the stem 31 and into engagement with the rear surface of the poppet valve. With the annular projection 34 in engagement with the piston head, the orifice 36 provides the major path of communication between the chamber and the inlet 18. Initial reverse flow will, therefore, be restricted and the pressure in the chamber will momentarily rise causing force to be applied to the poppet valve 33 which will move toward the inlet until it engages a retainer ring 37 disposed in the open end of the piston. The movement of the valve 33 relative to the piston, spaces the annular projection 34 from the piston and provides for substantially free flow of fluid from the chamber and around the poppet to the inlet 18. During such movement the orifice 36 is increased and fluid will flow over the edges of the notch to effect a cleansing action. It will be noted from Figs. 2 and 4 that the sides of the substantially triangular poppet valve body are spaced sufficiently from the inner circular wall of the piston head to permit unrestricted flow around the valve. Figs. 1 and 4 show that the rear edges of the ring 37 and the piston head are notched as at 38 so that when the piston is fully retracted and in engagement with the inner end of the cap 15 the full area of the piston will be exposed to inlet pressure.

Figs. 5 and 6 disclose a slightly modified form of poppet valve 40 which also has a somewhat triangularly shaped body with an unbroken annular projection 41 extending from its rear surface. This form of poppet valve has an orifice 42 formed at the center of the body within the annular projection. When the edge of the projection 41 is in sealing engagement with the piston 30, the orifice will provide restricted communication between the inlet and the chamber. This form of poppet valve is used in installations where larger orifices may be employed and the self-cleaning feature of the orifice is not necessary. The operation of the flow control valve with the modified poppet incorporated therein will be the same as the valve with the first form of poppet.

I claim:

1. A flow control valve comprising a body formed for connection in a fluid line, said body forming a chamber; a first means in said body forming a port establishing communication between said chamber and the fluid line at one end of said body; a second means disposed for movement in said chamber to vary the effective size of said port; a third means tending to urge said second means in a direction to increase the effective size of said port; a fourth means guided for movement toward and away from said second means, said fourth means forming a restricted orifice in one position relative to said second means to create a pressure differential on fluid flowing in one direction through said chamber, said second and fourth means being responsive to such pressure differential to move in a direction to reduce the effective size of said port, fluid flow in the opposite direction through said chamber serving to move said fourth means relative to said second means to a position offering but limited resistance to such flow in the opposite direction.

2. A flow control valve comprising a body forming a chamber with an inlet at one end and an outlet at the other; a first means in said body forming a port in communication with said outlet; a second means disposed in said chamber for movement relative to said first means to vary the effective size of said port; urging means normally tending to move said second means in a direction to increase the effective size of said port, said second means being movable in response to a pressure differential at opposite ends to decrease the effective size of said port; and an element disposed for movement relative to and in unison with said second means, said element forming a restricted orifice to create a pressure differential upon fluid flowing through said chamber from said inlet to said outlet, said pressure differential being applied through said element to said second means, fluid flow in the reverse direction through said chamber serving to move said element relative to said second means to provide substantially free flow in said reverse direction.

3. A flow control valve comprising a body forming a chamber with an inlet at one end and an outlet at the other; a first means in said body forming a port in communication with said outlet; a second means disposed in said chamber for movement relative to said first means to vary the effective size of said port; urging means normally tending to move said second means in a direction to increase the effective size of said port, said second means being movable in response to a pressure differential at opposite ends to decrease the effective size of said port; and a check valve element disposed for movement relative to and in unison with said second means, said check valve element forming a restricted orifice to create a pressure differential upon fluid flowing through said chamber from said inlet to said outlet, said pressure differential being applied through said element to said second means, fluid flow through said chamber from said outlet to said inlet serving to move said check valve element to an open position to provide substantially free flow in such reverse direction.

4. A flow control valve comprising a body forming a chamber with an inlet at one end and an outlet at the other; a first means in said body forming a port in communication with said outlet; a second means disposed in said chamber for movement relative to said first means to vary the effective size of said port; urging means normally tending to move said second means in a direction to increase the effective size of said port, said second means being movable in response to a pressure differential at opposite ends to decrease the effective size of said port; and a third means disposed for movement between two positions relative to said second means, one of said second and third means forming a restricted orifice to create a pressure differential upon fluid flowing through said chamber from said inlet to said outlet, said pressure differential being applied to said second means to move the same in opposition to said urging means, fluid flow through said chamber from said outlet to said inlet serving to move said third means to a position to provide a by-pass around said orifice.

5. A flow control valve comprising a body forming a chamber with an inlet at one end and an outlet at the other; a first means in said body forming a port in communication with said outlet; a second means disposed in said chamber for movement relative to said first means to vary the effective size of said port; urging means normally tending to move said second means in a direction to increase the effective size of said port, said second means being movable in response to a pressure differential at opposite ends to decrease the effective size of said port; and a third means disposed for movement between two positions relative to said second means, said second and third means cooperating in one of the positions of the latter to form a restricted orifice for creating a pressure differential upon fluid flowing through said chamber from said inlet to said outlet, said pressure differential being applied to said second means to move it in opposition to said urging means, said third means being shaped to provide relatively unrestricted passage for fluid flowing through said chamber from said outlet to said inlet when in the other of said two positions.

6. A flow control valve comprising a body forming a chamber with an inlet at one end and an outlet at the other; a first means in said body forming a port in communication with said outlet; a second means disposed in said chamber for movement relative to said first means to vary the effective size of said port; urging means normally tending to move said second means in a direction to increase the effective size of said port, said second means being movable in response to a pressure differential at opposite ends to decrease the effective size of said port; and a third means disposed for movement in one direction to engage and move with said second means, said second and third means forming a restricted orifice when engaged to create a pressure differential upon fluid flowing through said chamber from said inlet to said outlet, said pressure differential being applied to said second means to move it in opposition to said urging means, said third means being movable away from said second means to provide for substantially free flow through said chamber from said outlet to said inlet.

7. A flow control valve comprising a body formed at its ends for insertion in a fluid line, said body forming a chamber; means projecting from said body into said chamber, said means forming a port communicating with the fluid line at one end of said body; sleeve means disposed for sliding movement on said projecting means to vary the effective size of said port; spring means normally urging said sleeve means in a direction to increase the effective size of said port; and actuating means for said sleeve means, said actuating means being disposed in said chamber and having a pair of relatively movable elements forming a restricted orifice to create a pressure differential on fluid flowing in one direction through said chamber, said actuating means being responsive to such pressure differential to move said sleeve means in opposition to said spring means to reduce the effective size of said port, fluid flow in the opposite direction through said chamber serving to move said pair of elements relative to one another to provide for substantially free flow in such opposite direction.

8. A flow control valve comprising a body formed at its ends for insertion in a fluid line, said body forming a chamber; means projecting from said body into said chamber, said means forming a port communicating with the fluid line at one end of said body; sleeve means disposed for sliding movement on said projecting means to vary the effective size of said port; spring means tending to move said sleeve means in a direction to increase the effective size of said port; and actuating means for said sleeve means, said actuating means being disposed in said chamber and having a poppet valve element disposed for movement in response to fluid flow in one direction in said chamber to a position to restrict fluid flow and create a pressure differential, such pressure differential being applied to said sleeve means to move the same in opposition to said spring means to reduce the effective size of said port, said poppet valve being movable in response to fluid flow in the opposite direction through said chamber to another position to provide for substantially free flow in such opposite direction.

9. A flow control valve comprising a body formed for connection in a fluid line, said body forming a chamber; a projection on said body extending into said chamber, said projection forming a port communicating with said fluid line at one end of said body; a sleeve member mounted for sliding movement on said projection to vary the effective size of said port; spring means between said sleeve member and body, said spring means tending to move said sleeve member in a direction to increase the effective size of said port; sleeve pusher means guided for movement in said chamber; and a plate-like element disposed for movement toward and away from said sleeve pusher means, said element having a notched wall for engagement with said sleeve pusher to form a restricted orifice for creating a pressure differential on fluid flowing in one direction through said chamber, said sleeve pusher being responsive to such pressure differential when said plate-like element is engaged therewith to move said sleeve member in opposition to said spring in a direction to reduce the effective size of said port, fluid flow in the opposite direction through said chamber serving to move said plate-like element out of engagement with said sleeve pusher and increase the size of said orifice to clean the same.

10. A flow control valve comprising a body formed for connection in a fluid line, said body forming a chamber; a projection on said body extending into said chamber, said projection forming a port communicating with said fluid line at one end of said body; a sleeve member mounted for sliding movement on said projection to vary the effective size of said port; spring means between said sleeve member and body, said spring means tending to move said sleeve member in a direction to increase the effective size of said port; sleeve pusher means guided for movement in said chamber; a plate-like element disposed for movement toward and away from said sleeve pusher means, said element having a notched wall for engagement with said sleeve pusher to form a restricted orifice for creating a pressure differential on fluid flowing in one direction through said chamber, said sleeve pusher being responsive to such pressure differential when said plate-like element is engaged therewith to move said sleeve member in opposition to said spring in a direction to reduce the effective size of said port, fluid flow in the opposite direction through said chamber serving to move said plate-like element out of engagement with said sleeve pusher and increase the size of said orifice to clean the same; and means for limiting the extent of movement of said plate-like element away from said sleeve pusher means.

11. A flow control valve comprising a body formed for connection in a fluid line, said body defining a chamber and having a part projecting into said chamber to form a port communicating with the fluid line at one end of said body; a sleeve member mounted for sliding movement on said projecting part to vary the effective size of said port; resilient means between said sleeve member and body, said resilient means tending to move said sleeve member in a direction to increase the effective size of said port; sleeve pusher means guided for movement in said chamber; and a plate-like element disposed for movement between first and second positions relative to said sleeve pusher means, a restricted opening for fluid flow from one end of said sleeve pusher means to the other being provided in the first position of said plate-like element and a relatively unrestricted opening for reverse fluid flow being provided in the second position of said plate-like element, a pressure differential being created on fluid flowing in one direction through said chamber in said first position, said sleeve pusher being responsive to such pressure differential to move said sleeve member in opposition to said resilient means in a direction to reduce the effective size of said port.

12. A flow control valve comprising a body formed for connection in a fluid line, said body forming a chamber; a projection on said body extending into said chamber, said projection forming a port communicating with said fluid line at one end of said body; a sleeve member mounted for sliding movement on said projection to vary the effective size of said port; spring means between said sleeve member and body, said spring means tending to move said sleeve member in a direction to increase the effective size of said port; sleeve pusher means guided for movement in said chamber; and a plate-like element disposed for movement toward and away from said sleeve pusher means, said element defining a restricted opening operative when said element is engaged with said sleeve pusher to create a pressure differential on fluid flowing in one direction through said chamber, said sleeve pusher being responsive to such pressure differential to move said sleeve member in opposition to said spring in a direction to reduce the effective size of said port, fluid flow in the opposite direction through said chamber serving to move said plate-like element out of engagement with said sleeve pusher and permit free flow in such opposite direction.

13. A flow control valve comprising a body defining a chamber with an inlet at one end and an outlet at the other, said body forming a throttling opening communicating with said outlet; a piston-like member disposed for reciprocation in said chamber, said piston-like member having a part movable relative to said throttling opening to vary the effective size thereof, said piston-like member having an opening establishing communication between the portions of said chamber at opposite ends thereof; resilient means in said chamber urging said member in a direction to increase the effective size of said throttling opening; and a plate-like member disposed for engagement with the inlet side of said piston-like member to cover the opening therein, one of said members defining a restricted orifice to create a pressure differential at opposite ends of said piston-like member when said plate-like member covers the opening in said piston-like member and fluid flows from said inlet to said outlet, a tendency to increase said pressure differential serving to move said piston-like member against the force of said resilient means in a direction to decrease the effective size of said throttling opening, reverse flow of fluid through said chamber moving said plate-like member away from said piston-like member to uncover the opening therein and permit free fluid flow therethrough.

References Cited in the file of this patent

UNITED STATES PATENTS

| | | |
|---|---|---|
| 2,161,642 | Stroup | June 6, 1939 |
| 2,411,392 | Saville | Nov. 19, 1946 |
| 2,584,418 | Branson | Feb. 5, 1952 |